United States Patent [19]

Wallace et al.

[11] Patent Number: 4,512,965
[45] Date of Patent: Apr. 23, 1985

[54] HYDROGEN STORAGE MATERIALS OF HYPERSTOICHIOMETRIC ALLOYS

[75] Inventors: William E. Wallace; Faiz Pourarian, both of Pittsburgh, Pa.

[73] Assignee: Koppers Company, Inc., Pittsburgh, Pa.

[21] Appl. No.: 553,804

[22] Filed: Nov. 21, 1983

[51] Int. Cl.³ .................. C22C 30/00; C01B 6/00
[52] U.S. Cl. ........................... 423/644; 420/583; 420/584; 420/585; 420/586; 420/900
[58] Field of Search ............. 420/900, 580, 581, 583, 420/584, 582, 585, 586, 587, 588, 422, 428; 423/644, 648 R

[56] References Cited

U.S. PATENT DOCUMENTS 4,163,666  8/1979  Shaltiel et al. ............. 420/580

OTHER PUBLICATIONS

Pourarian F. et al., "Stability and Magnetism of Hydride of Nonstoichiometric $ZrMn_2$" J. Phys. Chem. 85, pp. 3105–3111, 1981.

Primary Examiner—L. Dewayne Rutledge
Assistant Examiner—Christopher W. Brody
Attorney, Agent, or Firm—Donald M. MacKay; Herbert J. Zeh, Jr.

[57] ABSTRACT

Quaternary hyperstoichiometric alloys of the formula: $ZrCrFeT_x$ and their hydrides are provided, characterized as having $MgZn_2$ hexagonal crystal structure wherein T is selected from Mn, Fe, Co, Ni and Cu, and X is a number from 0.1 to 1.0. These alloys readily form hydrides at low hydrogen pressure and are suitable for use as hydrogen storage materials.

11 Claims, 10 Drawing Figures

Pressure-Composition Isotherms For $ZrCrFeMn_{0.8}$-H

Pressure-Composition Isotherms For $ZrCrFe_{1.6}-H$

Pressure-Composition Isotherms For $ZrCrFeCo_{0.8}$-H

Pressure-Composition Isotherms For ZrCrFeCu$_{0.8}$-H

Absorption Desorption of Hydrogen By $ZrCrFeFe_{0.8}$, $ZrCrFeCo_{0.8}$ and $ZrCrFeNi_{0.8}$ At Room Temperature

HYDROGEN STORAGE MATERIALS OF HYPERSTOICHIOMETRIC ALLOYS

BACKGROUND OF THE INVENTION

1. Field of the Invention

Many types of intermetallic compounds are known for use as hydrogen storage materials. Of particular interest herein are hydrogen storage materials provided by $ZrCr_2$-type alloys of the general formula $ZrCrFeT_x$ wherein T=Mn, Fe, Co, Ni and Cu wherein x=0.1 to 1.0, and their hydrides which are characterized as having the C14 hexagonal crystal structure.

2. State of the Art

A material suitable for storage of hydrogen must satisfy many manding criteria. In addition to large storage capacity for hydrogen, a hydrogen storage material should absorb and desorb hydrogen quickly, preferably at a pressure near one atmosphere, and the material should show a minimum of hysteresis effects during a hydrogen absorption/desorption cycle.

Intermetallic compounds which have received much attention for use as hydrogen storage materials are provided by derivatives of $ZrCr_2$ compounds, which compounds are characterized by $MgZn_2$ hexagonal C14 crystal structure. It is well known that the $ZrCr_2$ system is capable of absorbing copious quantities of hydrogen, but that hydrides formed from the $ZrCr_2$ system are too stable to be of practical significance. In search of improved $ZrCr_2$ type systems for hydrogen storage, alloys have been prepared which contain other elements substituted for all or a portion of the zirconium, but with the $ZrCr_2$ stoichiometry maintained in the new alloy. For example, in Shaltiel et al., J. Less-Comm. Metals, 53 117–131 (1977), there are described changes in properties of stoichiometric Laves-phase $ZrCr_2$-based compounds by substitution of chromium with a 3d transition metal in accordance with the empirical formula $Zr(Co_xM_{1-x})_2$ and $Zr(Fe_xM_{1-x})_2$ wherein M=V, Cr, Mn and x is between zero and one. For hyperstoichiometric $ZrMn_2$-based alloys Van Essen and Buschow, Van Essen et al., Mat. Res. Bull, 15, 2249–1155 (1980) and Pourarian et al., J. Phys. Chem., 85, 3105–3111, have shown that excess Mn in $ZrMn_{2+x}$, $x \leq 1.8$, raises the vapor pressure of the hydride by as much as 50-fold, which makes them more useful materials for hydrogen storage.

SUMMARY OF THE INVENTION

Improved hydrogen storage materials are provided by hyperstoichiometric alloys expressed by the empirical formula $ZrCrFeT_x$ wherein T=Mn, Fe, Co, Ni and Cu wherein x=0.1 to 1.0 and preferably 0.1 to 0.8, and their hydrides.

Alloys of said formula have substantial hydrogen storage capacities along with the capability of forming hydrides less stable than $ZrCr_2$ systems, so as to make these alloys suitable candidates for hydrogen storage materials at elevated temperatures.

DESCRIPTION OF PREFERRED EMBODIMENTS

Figure 1:
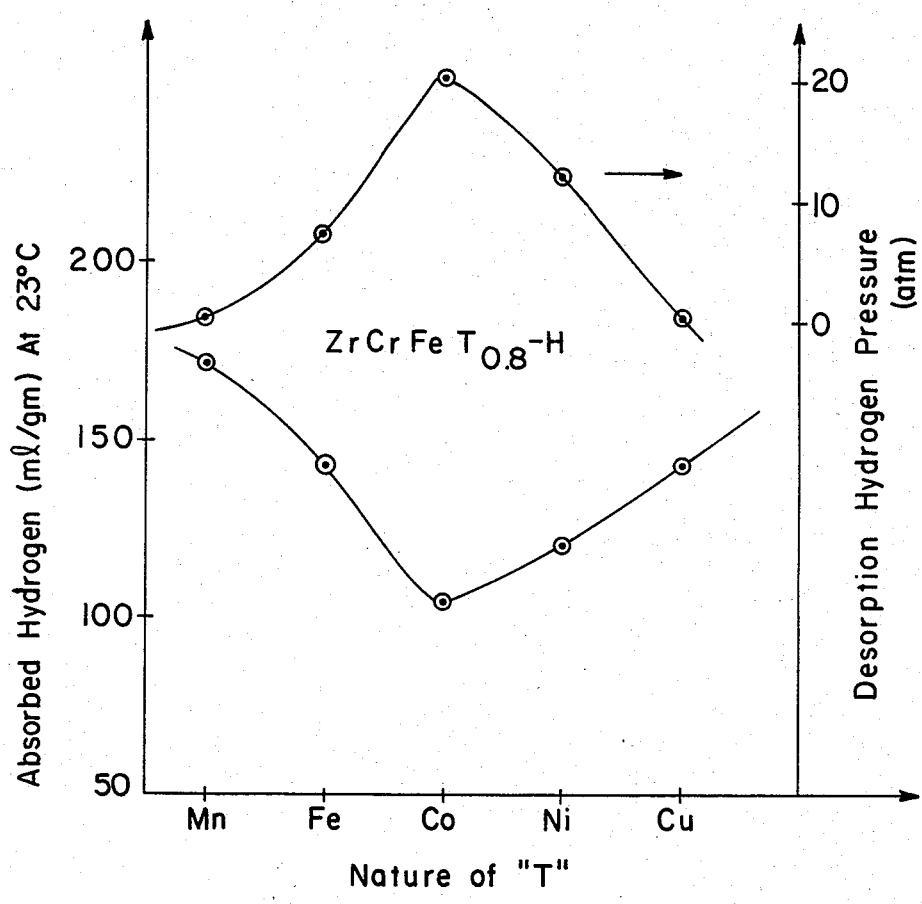
FIG. 1 shows the absorbed hydrogen capacity and desorbed hydrogen pressure at the hydride concentration of 1.5 gm atom H/mole alloy at room temperature for $ZrCrFeT_{0.8}$ hydrides.
Figure 2:
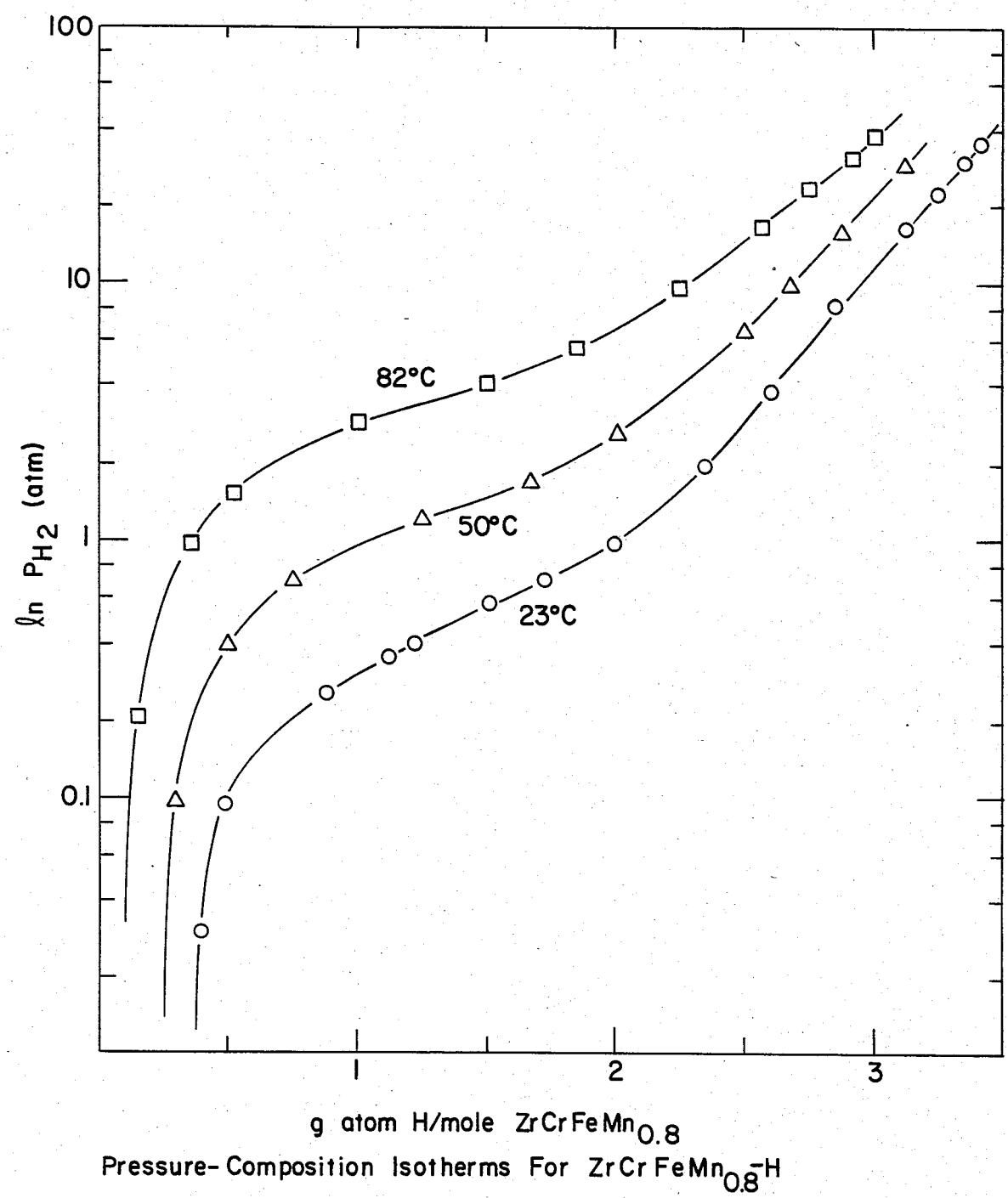
FIGS. 2–7 are pressure-composition isotherms for representative examples of the invention.
Figure 3:
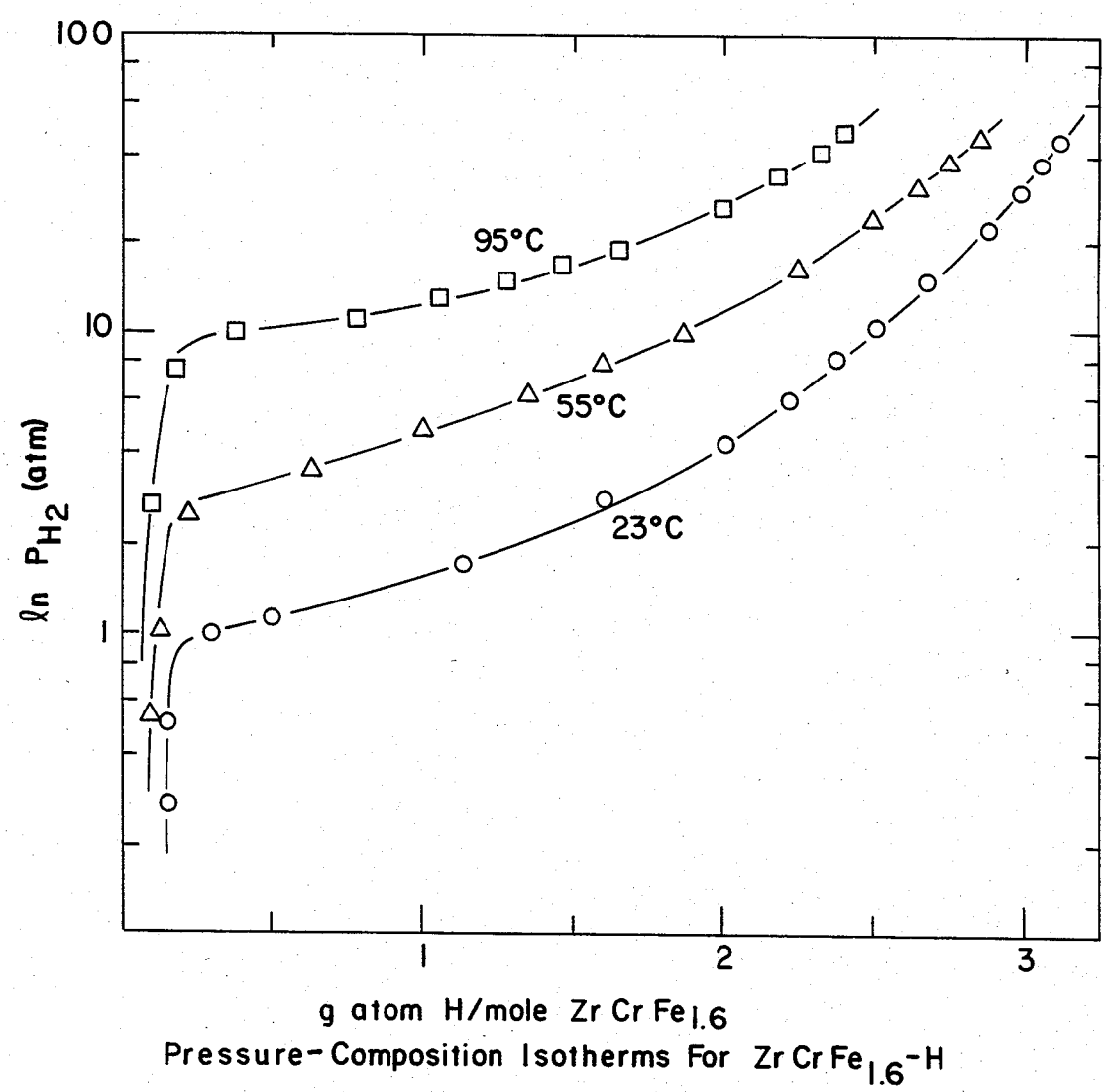
Figure 4:
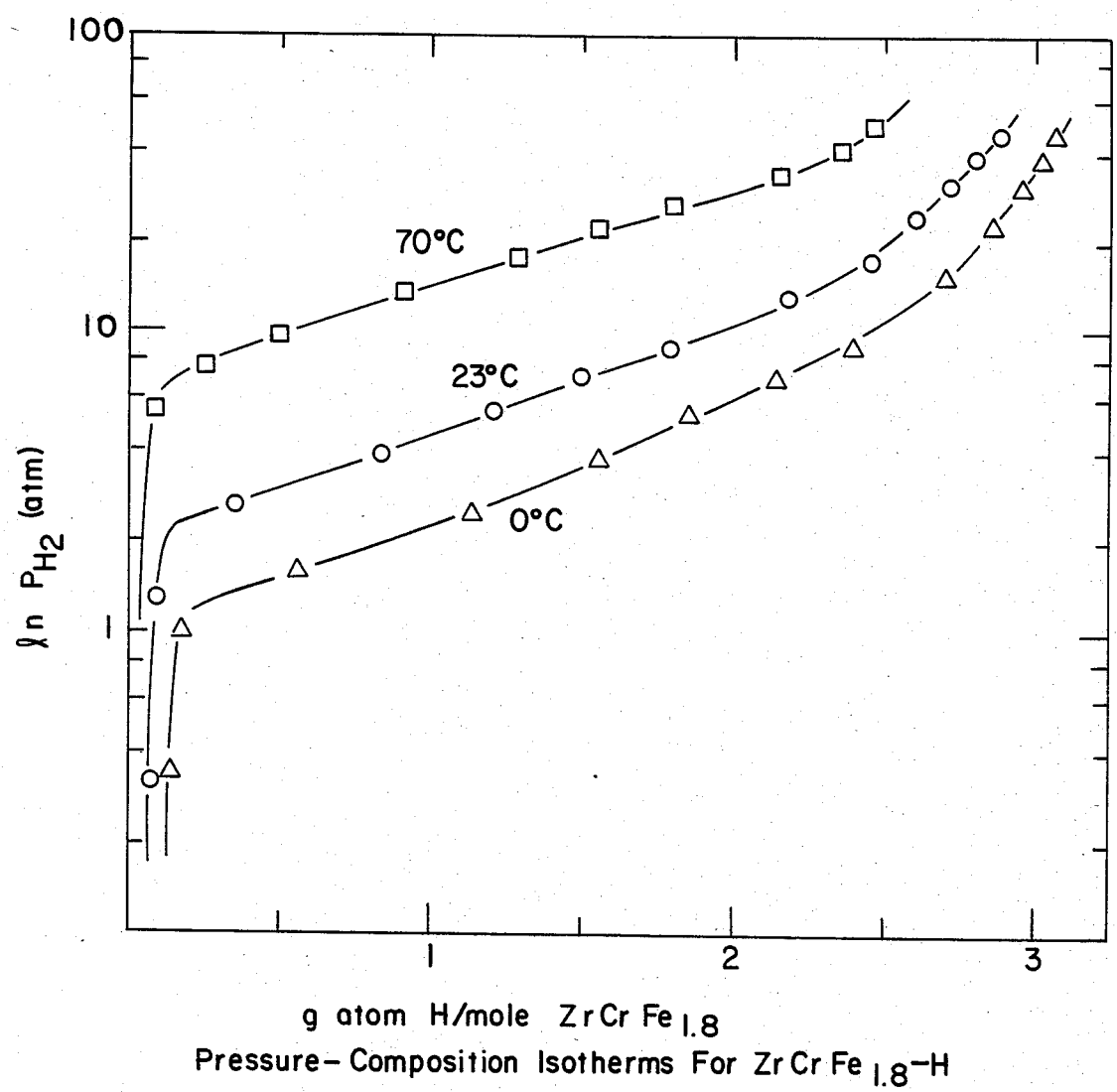
Figure 5:
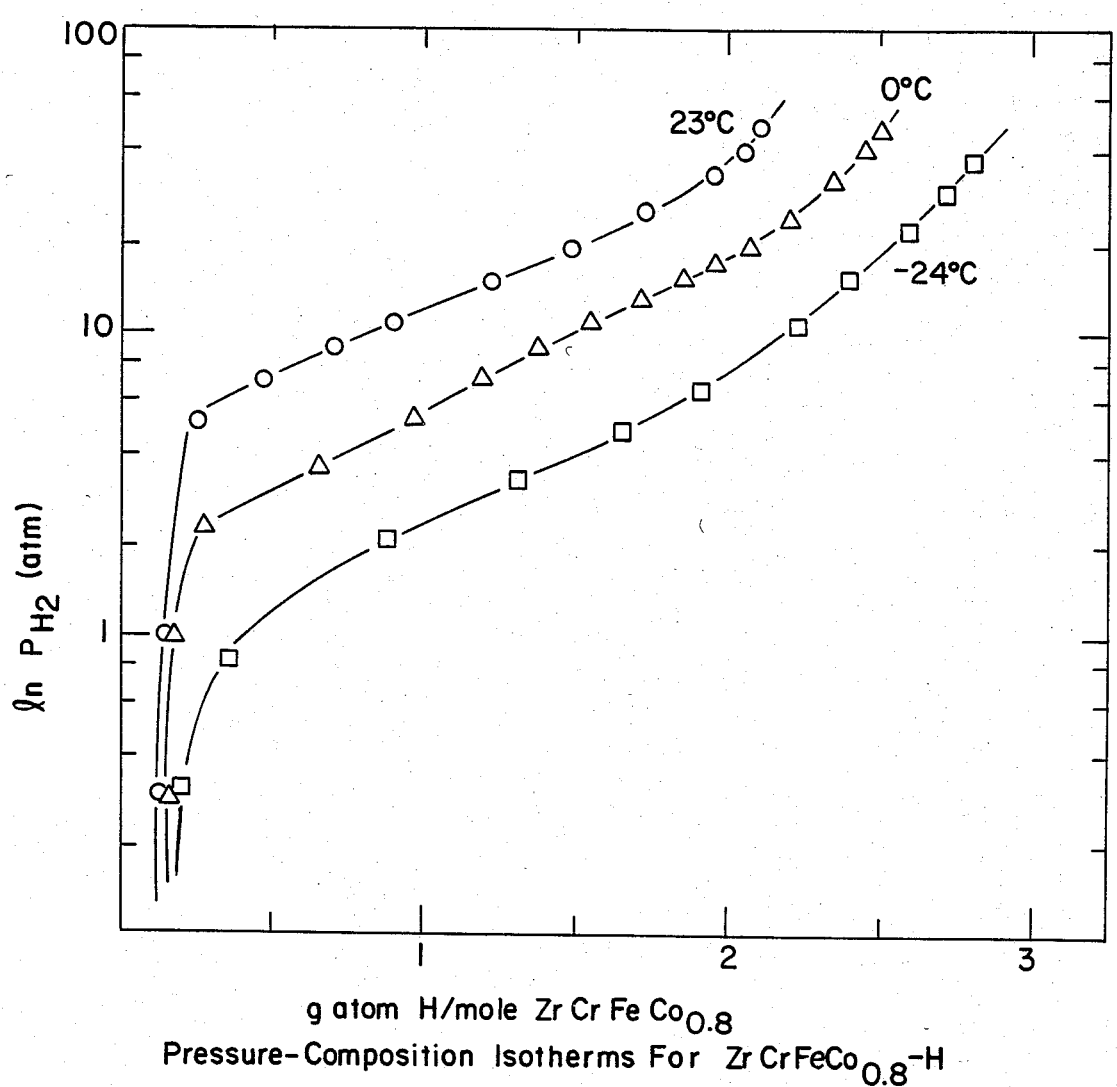
Figure 6:
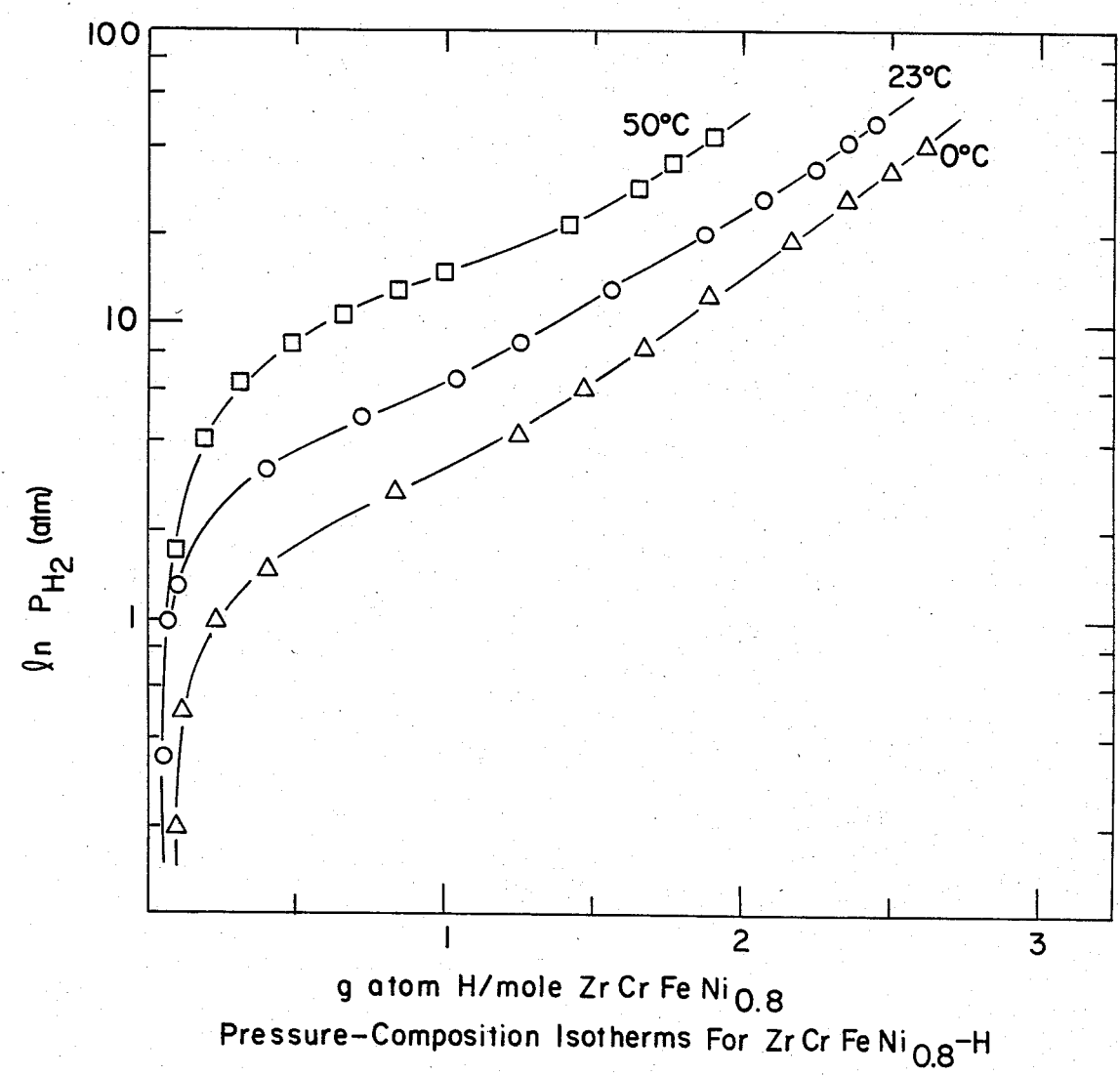
Figure 7:
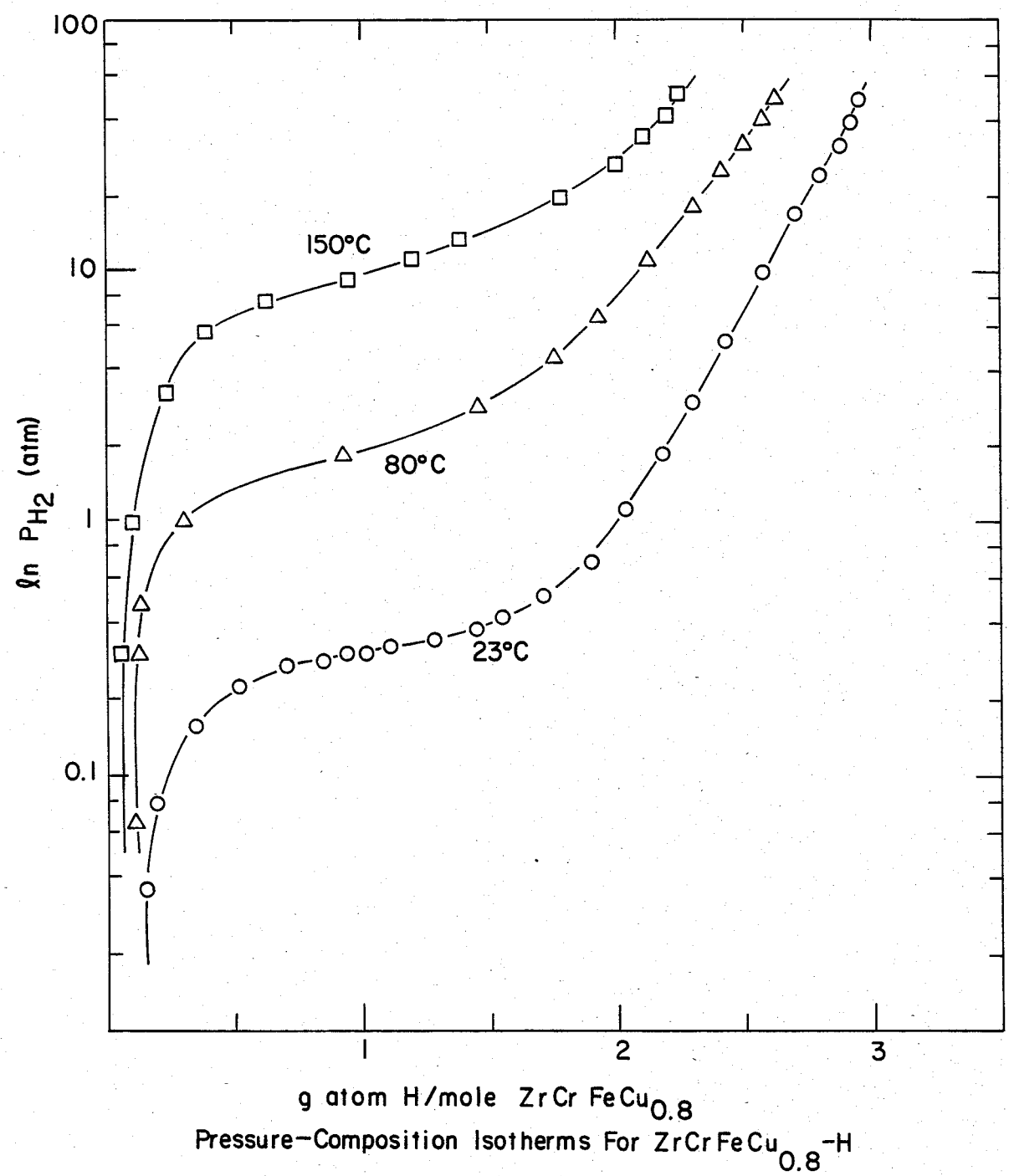

An alloy of the invention is characterized generally as Laves-phase intermetallic compound composed of zirconium and chromium wherein one of manganese, iron, cobalt, nickel or copper added to form a hyperstoichiometric alloy with a C14 hexagonal crystal structure. The crystal structure for compounds of the invention are characterized by lattice parameters obtained by X ray diffraction having approximate values in the following ranges:

a=4.97 Å to 5.01 Å
c=8.12 Å to 8.21 Å

A general procedure for preparation of these alloys follows. Weighed amounts of the constituents are placed in a copper boat for heating to a fusing temperature. Heating is accomplished typically by means of an r.f. 450 KHz induction heater. The copper boat is mounted inside a vacuum-tight quartz tube through which a stream of Ti-gettered argon passes during the heating period. Fusing of the constituents takes place by heating a mixture of the constituents to about 1500° C. in about two minutes, and holding at that temperature for about one minute. Then the sample is cooled to room temperature in a period of about one minute and the hardened sample is turned over in the boat. Melting and cooling are repeated through four cycles, typically. Usually, the actual loss of the sample is within ±0.05% by weight. All the samples were homogenized at approximately 1000° C. for a period of 2 to 3 hours.

In order to activate the sample to make it suitable as a hydrogen storage material, about two grams of the annealed sample is placed in a stainless steel pressure reactor vessel suitable for use in forming a hydride of the sample. The reactor is evacuated to a pressure of about $10^{-3}$ Torr. Then pure hydrogen is pumped into the reactor to a pressure of about 40 to 50 atm., with the reactor vessel temperature initially at about 25° C., until hydrogen is no longer absorbed by the sample. Usually, within two minutes of the time hydrogen is initially introduced into the reactor, the reaction vessel temperature increases to about 50° C. Then the reactor is allowed to cool to room temperature over a period of about 30 minutes, after which time the pressure within the reactor is usually about 45 atm. The pressure in the reactor is reduced to ambient, and then the sample is subjected to a pressure of about $10^{-3}$ Torr for about 20 minutes in order for the sample to desorb substantially all of the previously-absorbed hydrogen. Portions of the hydrogen were removed from the specimen, and the pressure was recorded for the composition corresponding to the hydrogen remaining in the metal. The concentrations were established employing the gas law with appropriate corrections. Equilibrium was reached within a few minutes; however, the hydrogen pressure was recorded only after it had remained constant for ~5 h. The PCI's were determined for temperatures between 23° to approximately 150° C. Care was taken in each sequence of experiments to stabilize the temperature of the sample after removal or addition of hydrogen. This is important for reliable determinations of the PCI's and the acquisition of accurate results for the heats and entropies of dissociation. The hydrogen capacity values ($H_n$) were determined at 23° C. and ~40 atm., for all the examples.

In order to obtain a fully-activated hydrogen storage material, the sample is subjected to about 25 absorption-desorption cycles, under conditions as described for the activation procedure above. At the end of this activating period, there is obtained a repeatable pressure-composition profile. To obtain crystal structure data on the hydrides, a portion of the activated sample is hydrogenated to a known composition in accordance with the previously-established pressure-composition isotherm. Then the hydrogenated sample is cooled quickly by quenching the sample boat (reactor) in liquid nitrogen, and rapidly pumping away remaining gaseous hydrogen. In accordance with the technique of Gualtieri et al., [*J. Appl. Phys.*, 47, 3432 (1976)], a few Torr of $SO_2$ is admitted to the reaction vessel to poison the surface of the sample, and thereby seal in the hydrogen. After the sample warms to room temperature, X ray diffraction data are obtained for the sample.

In order to demonstrate the preparation of the alloys of the invention and their hydrides, and to obtain data as to characteristics and properties of the alloys, 6 alloys and their hydrides were actually prepared in accordance with the aforementioned, generally-described procedures. Essential parameters such as constituent weights, lattice parameters and hydriding characteristics are summarized in Tables I–II. The metal constituents were at 99.9 percent purity or greater and obtained from Alfa Products, Ventron Div., Danvers, MA.

TABLE I

Preparation of $ZrCrFeT_{0.8}$ Alloys

| Sample No. | Alloy | Amount of Each Constituent (gm) | | | | Heat Treatment | |
|---|---|---|---|---|---|---|---|
| | | Zr | Cr | Fe | T | Temp (C.°) | Period (Hrs) |
| I | $ZrCrFeMn_{0.8}$ | 1.450 | 0.826 | 0.887 | 0.698 | 900 | 2 |
| II | $ZrCrFeFe_{0.6}$ | 1.410 | 0.804 | 1.381 | 0.0 | 1000 | 3 |
| III | $ZrCrFeFe_{0.8}$ | 1.501 | 0.855 | 1.654 | 0.0 | 1000 | 3 |
| IV | $ZrCrFeCo_{0.8}$ | 1.520 | 0.866 | 0.930 | 0.786 | 1000 | 3 |
| V | $ZrCrFeNi_{0.8}$ | 1.306 | 0.744 | 0.799 | 0.672 | 1000 | 3 |
| VI | $ZrCrFeCu_{0.8}$ | 1.420 | 0.809 | 0.869 | 0.791 | 900 | 3 |

TABLE II

| Sample No. | Metal or Alloy Hydride | Lattice Parameters a (Å) | c (Å) | Unit Cell Volume V (Å)³ | Hydrogen Storage Capacity at 23° C. ml $H_2$/gm alloy |
|---|---|---|---|---|---|
| I | $ZrCrFeMn_{0.8}$ | 5.011 | 8.208 | 178.49 | |
| II | $ZrCrFeMn_{0.8}H_{3.45}$ | 5.353 | 8.740 | 216.89 | 172 |
| III | $ZrCrFeFe_{0.6}$ | 5.001 | 8.180 | 177.17 | |
| IV | $ZrCrFeFe_{0.6}H_{3.12}$ | 5.306 | 8.642 | 210.70 | 163 |
| V | $ZrCrFeFe_{0.8}$ | 4.993 | 8.162 | 176.21 | |
| VI | $ZrCrFeFe_{0.8}H_{2.88}$ | 5.327 | 8.693* | 213.63 | 144 |
| VII | $ZrCrFeCo_{0.8}$ | 4.965 | 8.129 | 173.54 | |
| VIII | $ZrCrFeCo_{0.8}H_{2.1}$ | 5.286 | 8.614 | 208.44 | 104 |
| IX | $ZrCrFeNi_{0.8}$ | 4.975 | 8.121 | 174.07 | |
| X | $ZrCrFeNi_{0.8}H_{2.45}$ | 5.307 | 8.649 | 210.96 | 121 |
| XI | $ZrCrFeCu_{0.8}$ | 5.009 | 8.206 | 178.30 | |
| XII | $ZrCrFeCu_{0.8}H_{2.95}$ | 5.351 | 8.738 | 216.67 | 143 |

FIG. 1 shows the amount of the hydrogen absorbed by the example alloys and also shows the dependence of the dissociation hydrogen pressure with the alloy composition at the hydride concentration of 1.5 gm. atom H/mole alloy.

The pressure-composition isotherms of FIGS. 2–7 for representative embodiments of the hyperstoichiometric zirconium-chromium alloy systems of the invention demonstrate important advantages of this system over the $ZrCr_2$ alloy. For example, the vapor pressure of the hydrides of the invention are higher by as much as 2,000 times that of $ZrCr_2$.

Figure 8:
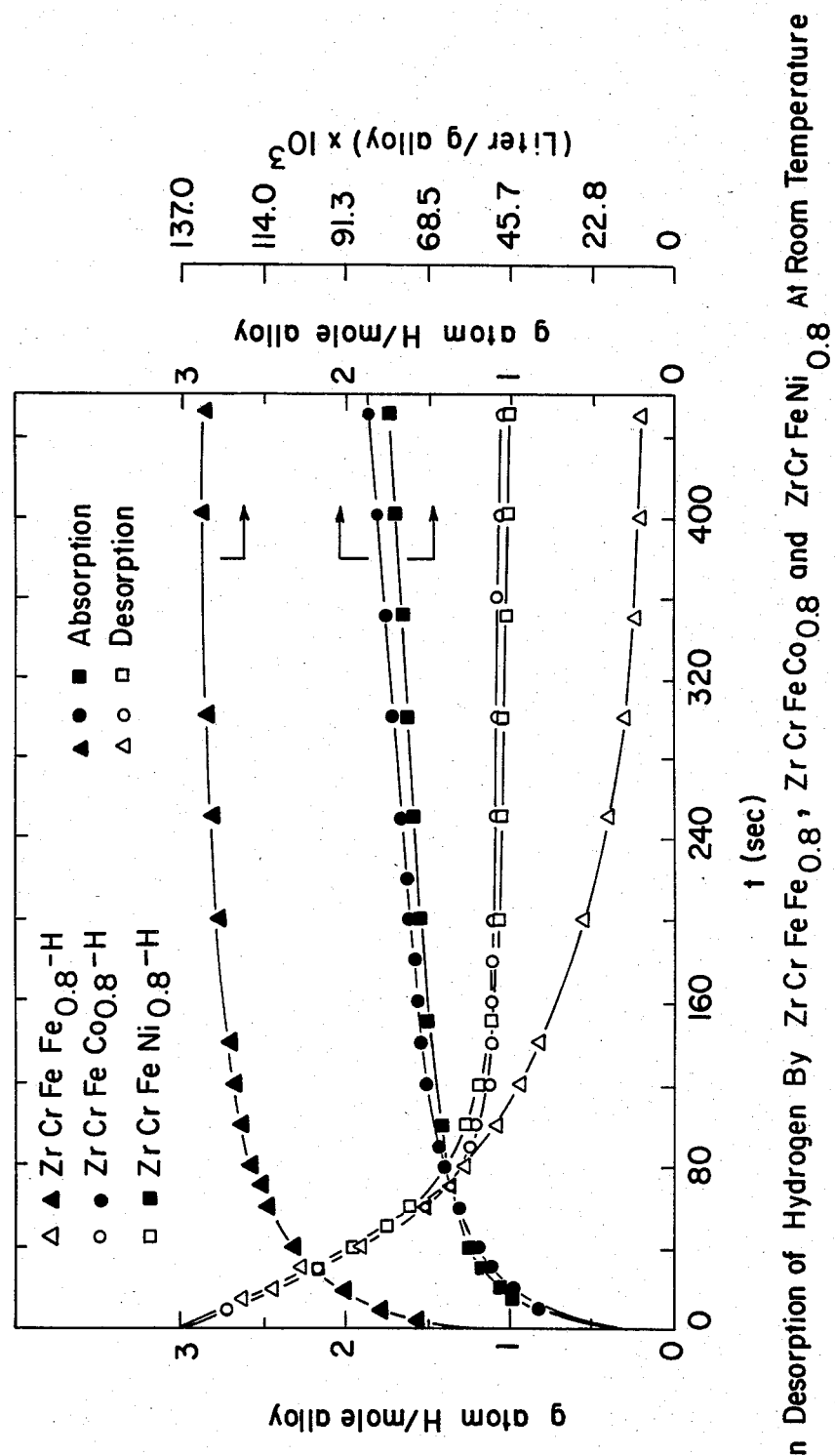
FIGS. 8 and 9 are kinetics of hydrogen desorption and absorption curves for representative examples of the invention.
Figure 9:
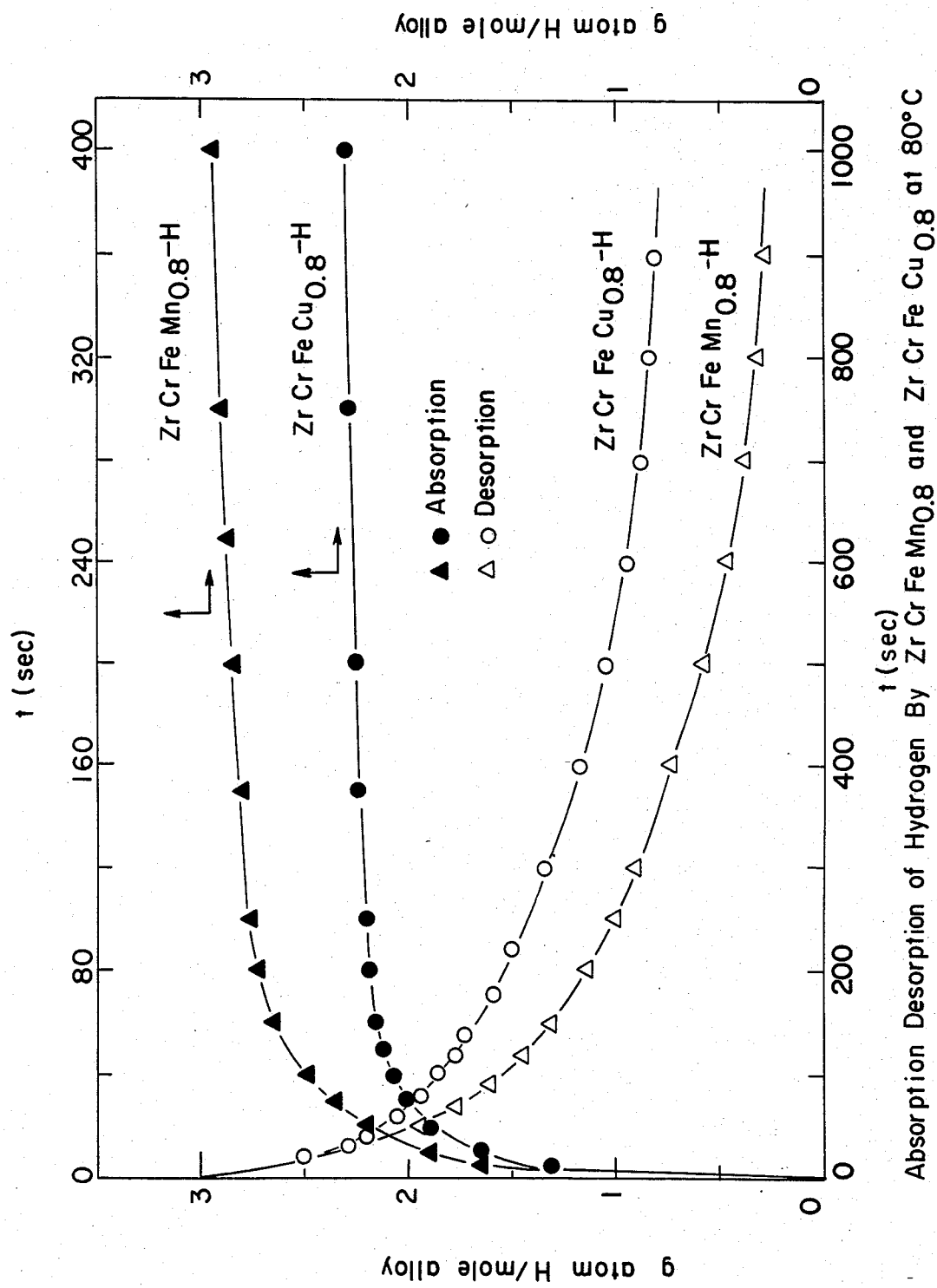

The alloys of the invention are characterized by very rapid absorption/desorption of hydrogen. As shown in FIGS. 8 and 9, a condition of 80% complete hydrogen absorption is achieved at about 40 sec, 140 sec, and 150 sec, for T=Fe, Co and Ni, respectively, whereas for the hydrides with T=Mn and Cu, 80% of the hydrogen is absorbed in ~80 sec and 50 sec, respectively. All samples were activated before the experiment by sequentially absorbing and desorbing hydrogen at least 10 times to insure a constant active surface. In the case of the hydrogen desorption rate, which is found to be slower than the uptake process, almost 70% of the hydrogen is released at 60 sec to 100 sec for the hydrides with T=Fe, Co and Ni, and 80% of the hydrogen was desorbed at 350 sec to 400 sec at 80% for hydrides with T=Mn and Cu. These properties illustrated in the above figures render them useful as hydrogen storage materials.

Figure 10:
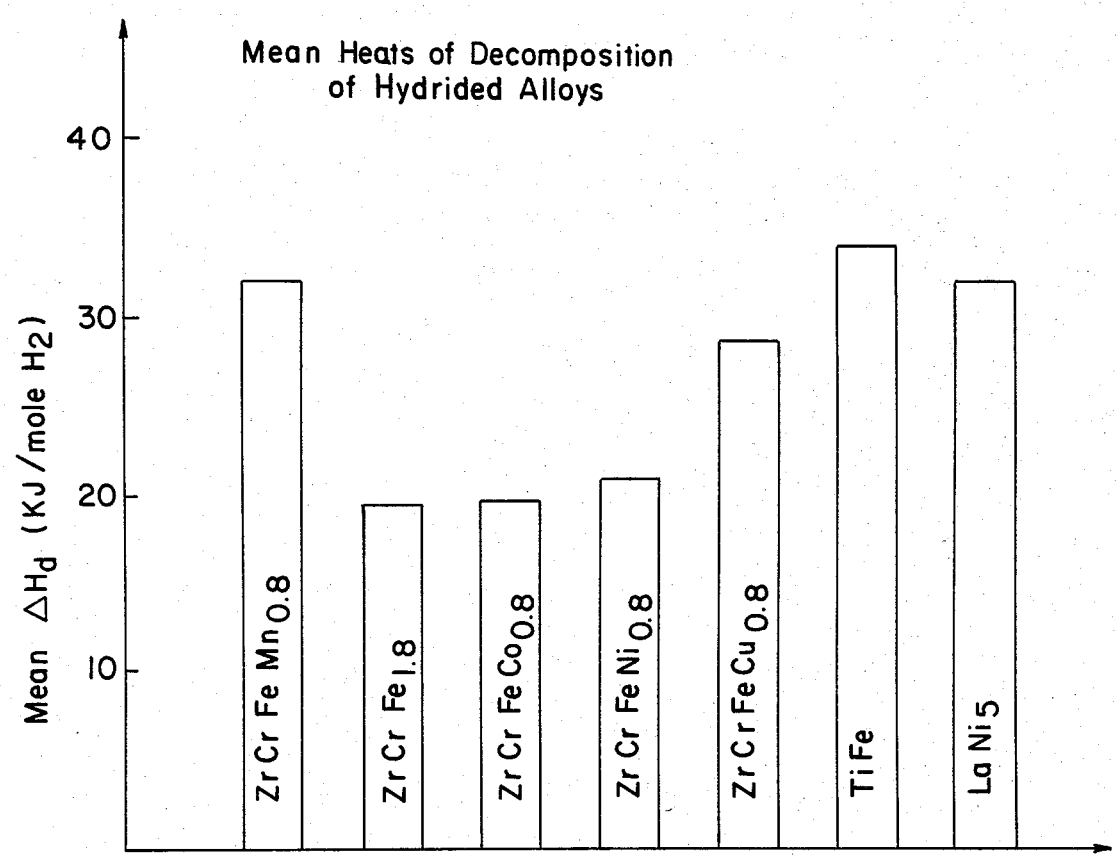
FIG. 10 details the mean heats of decomposition of hydrided alloys of the invention. Heats of decomposition of the conventional $LaNi_5$ and TiFe hydrides are also included for purposes of comparison.

The alloys of the invention have relatively low enthalphy ΔH except for the $ZrCrFeMn_{0.8}$ hydride as compared to conventional $LaNi_5$ hydride and TiFe hydride as shown in FIG. 10 for representative examples.

The small value of ΔH is significant in regard to the exploitation of hydrogen as a fuel. As the heat absorbed in the release of hydrogen is smaller, the fuel value of the hydrogen stored in the hydride is correspondingly enhanced since less heat must be allocated to effect the endothermal release of hydrogen from the hydride. The small value of ΔH has the additional advantage in that heat flow demands are reduced. This could be a significant factor in large-scale applications involving massive hydride beds since such beds have poor thermal conductivity characteristics.

Although specific examples of the invention have been set forth hereinabove, it is not intended that the invention be limited solely thereto, but is to include all the variations and modifications falling within the scope of the appended claims.

What is claimed is:

1. Alloys of elements in an atomic ratio is expressed by the formula $ZrCrFeT_x$ wherein T is selected from the group consisting of manganese, iron, cobalt, nickel and copper and wherein x has a value between 0.1 and 1.0 except when T is iron and then x has a value between 0.1 and 0.6, and their hydrides.

2. The alloy of claim 1 expressed by the formula $ZrCrFeMn_{0.8}$. 

3. The hydride of claim 2.
4. The alloy of claim 1 expressed by the formula $ZrCrFeFe_{0.6}$. 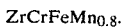

5. The hydride of claim 4.
6. The alloy of claim 1 expressed by the formula 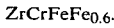

ZrCrFeCo$_{0.8}$.

7. The hydride of claim 6.
8. The alloy of claim 1 expressed by the formula ZrCrFeNi$_{0.8}$.

9. The hydride of claim 8.
10. The alloy of claim 1 expressed by the formula ZrCrFeCu$_{0.8}$.

11. The hydride of claim 10.

* * * * *